United States Patent [19]

Shibayama et al.

[11] 4,192,786

[45] Mar. 11, 1980

[54] EPOXY RESIN COMPOSITION CONTAINING GLYCIDYL ETHER-METAL CARBOXYLATE CATALYST

[75] Inventors: Kyoichi Shibayama; Kazuo Okahashi; Osamu Hayashi, all of Hyogo, Japan

[73] Assignee: Mitsubishi Denki Kabushiki Kaisha, Tokyo, Japan

[21] Appl. No.: 897,772

[22] Filed: Apr. 19, 1978

[30] Foreign Application Priority Data

Aug. 6, 1977 [JP] Japan ................................. 52-94524

[51] Int. Cl.$^2$ ...................... C08G 59/68; C08G 59/42
[52] U.S. Cl. .............................. 260/18 EP; 528/361; 528/365; 528/92; 528/103; 525/533
[58] Field of Search .................. 528/92, 95, 361, 365; 260/830 TW, 18EP

[56] References Cited

U.S. PATENT DOCUMENTS

| | | | |
|---|---|---|---|
| 3,477,971 | 11/1969 | Allen et al. | 260/18 |
| 3,689,444 | 9/1972 | Wolfe | 260/18 EP |
| 3,692,715 | 9/1972 | Groff et al. | 260/18 EP |
| 3,867,354 | 2/1975 | Betts et al. | 260/78.4 EP |
| 3,968,135 | 7/1976 | Steele et al. | 260/438.5 R |

*Primary Examiner*—Earl A. Nielsen
*Attorney, Agent, or Firm*—Wenderoth, Lind & Ponack

[57] ABSTRACT

This invention relates to an epoxy resin composition suitable for impregnating coils of electrical apparatus such as motors, generators and the like. More particularly, this invention relates to an epoxy resin composition having excellent workability and a long pot life, which composition is prepared by adding the reaction product of the glycidyl ether of a monoalcohol and a metal carboxylate, which works as a reactive diluent and accelerator, to an epoxy resin having at least two epoxy groups per molecule and containing a curing agent.

10 Claims, No Drawings

EPOXY RESIN COMPOSITION CONTAINING GLYCIDYL ETHER-METAL CARBOXYLATECATALYST

BACKGROUND OF THE INVENTION

Heretofore, a typical example of an epoxy resin composition suitable for impregnation was a bisphenol type epoxy resin containing an acid anhydride, e.g. methyltetrahydrophthalic anhydride, as a curing agent and a tertiary amine, imidazole or metal chelate compound as an accelerator. This conventional composition generally has a short pot life and a viscosity incompatible with workability, i.e. the viscosity is too high. In order to improve workability (to lower the viscosity), monoglycidyl ethers such as butyl glycidyl ether, allyl glycidyl ether and the like, or diglycidyl ethers such as ethylene glycol diglycidyl ether, propylene glycol diglycidyl ether and the like, can be used. However, there is the disadvantage that an improvement in pot life can not be expected.

One of the easiest methods to overcome the above mentioned disadvantage is to add a curing agent and an accelerator to the epoxy resin at the time of using the resinous composition. However, this method is not employed to apply insulation to the coils of electrical machinery and apparatuses on an industrial scale since the operation is complicated and work efficiency is very low.

Accordingly, the above mentioned epoxy resin is usually stored in a resin tank, and is kept cool to prolong the pot life. However, even by this method, the pot life is limited and the viscosity increases. Therefore, a part of the resinous composition must be disposed of and a newly prepared resinous composition must be supplied to modify the viscosity. Thus, the disposal and the supply must be repeated. This is a very unfavorable point in view of industrial and economical considerations.

Under these circumstances, it is presently required that an epoxy resin composition having not only good electrical and mechanical properties but also excellent workability and a long pot life be provided.

SUMMARY OF THE INVENTION

As a result of various research with these points in mind, we have found that the reaction product of the glycidyl ether of a monoalcohol and a metal carboxylate not only works as a reactive diluent and accelerator to an epoxy resin composition containing a curing agent but also prolongs the pot life and provides an appropriate viscosity to the composition. Besides, said reaction product provides excellent electrical and mechanical properties to the composition when it is cured.

Thus, the epoxy resin composition of the present invention is prepared by mixing an epoxy resin having not less than two epoxy groups per molecule, an acid anhydride curing agent and the reaction product of the glycidyl ether of a monoalcohol and a metal carboxylate.

Preferably, the epoxy resin composition of the present invention comprises a mixture of 40-90 parts by weight of said epoxy resin, 70-100 parts by weight of said acid anhydride curing agent and 60-10 parts by weight of said reaction product.

In the reaction of the glycidyl ether of a monoalcohol and a metal carboxylate, the latter is used preferably in an amount of 0.2-1.0% by weight of the former.

DESCRIPTION OF THE PREFERRED EMBODIMENT

Examples of epoxy resin having at least two epoxy groups per molecule used as the first ingredient in the epoxy resin composition of the present invention preferably include bisphenol type epoxy resin as represented by the following formula:

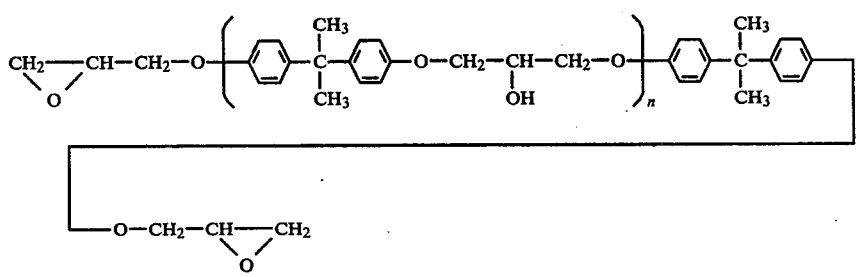

(where n represents an integer of up to about 15)

Examples of this epoxy resin commercially available include Epikote 828, 826 (both trade names, manufactured by Shell Chemical Corp.), DER 332, 330, 331 (all trade names, manufactured by Dow Chemical Co.), Araldite GY 250, 260 (both trade names, manufactured by Ciba Co.) and the like.

In admixture with said bisphenol type epoxy resin, cycloaliphatic type epoxy resin as represented by the following structural formula may be used.

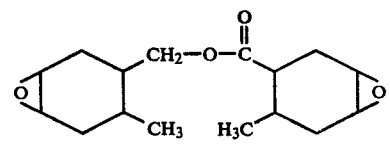

Examples of this epoxy resin commercially available include ERL-4201, ERL-4221, (trade names, manufactured by Union Carbide Corp.), and the like.

Said cycloaliphatic type epoxy resin is mixed with said bisphenol type epoxy resin in an amount of 20-60% by weight, preferably 30-50% by weight, based on the weight of the bisphenol type epoxy resin.

When the above mentioned cycloaliphatic type epoxy resin is added, the electrical properties, particularly the anti-tracking properties, of the cured resin thus obtained are improved. If the amount of the cycloaliphatic type epoxy resin added is less than 20%, this effect is insufficient, while if the amount added is more than 60%, the pot life is unsuitably shortened.

The acid anhydride type curing agent used in the present invention is preferably liquid at room temperature, examples of which include methyl hexahydrophthalic anhydride, methyl tetrahydrophthalic anhydride, methyl nadic anhydride and the like.

Examples of the glycidyl ether of a monoalcohol, which is one of the ingredients of the reaction product used in the present invention, include butyl glycidyl ether, phenyl glycidyl ether, cresyl glycidyl ether, P-butyl phenyl glycidyl ether and the like. Examples of the metal carboxylate, which is the other ingredient of the reaction product, include metal carboxylates having 5-17 carbon atoms such as the zinc, manganese, cobalt and nickel salts of octanoic acid, stearic acid, palmitic acid, naphthenic acid, caproic acid, enanthic acid, capric acid, myristic acid, lauric acid and the like.

Said reaction product can be obtained, for example, by adding a metal carboxylate to the above mentioned monoglycidyl ether and reacting the mixture at about 50° C. for 2-4 hours in an atmosphere of nitrogen with stirring. In this reaction, the optimum reaction temperature ranges from 35° to 70° C., at which the effect of the catalyst clearly appears. The suitable amount of said metal carboxylate added is 0.2 to 1.0% by weight of the glycidyl ether of the monoalcohol. If the amount added is more than 1.0%, the pot life becomes short, while if it is less than 0.2%, gelation is unsuitably retarded. Thus, if the specific ingredient is previously reacted as mentioned above, the system becomes stabilized.

The epoxy resin composition of this invention can be obtained by mixing the above mentioned epoxy resin, acid anhydride and reaction product is an appropriate ratio, the generally preferable mixing ratio in view of workability and other properties of the cured product being 40-90 parts by weight, 70-100 parts by weight and 60-10 parts by weight respectively.

Fillers such as glass fiber, mica, inorganic powder or the like may be mixed with the epoxy resin composition of this invention. The epoxy resin composition of this invention is useful not only for impregnating coils but also for coating, casting or bonding.

The present invention is more fully illustrated by the following reference examples and working examples.

REFERENCE EXAMPLE 1

An epoxy resin composition was prepared by intimately mixing 80 parts by weight of Epikote 828 (trade name, manufactured by Shell Chemical Corp.), 85 parts by weight of methyl hexahydrophthalic anhydride (curing agent) and 20 parts by weight of ethylene glycol diglycidyl ether. Various properties of the epoxy resin composition thus prepared were mesured as follows:

(1) The epoxy resin composition above prepared was heat-cured at 150° C. for about 50 hours to form a cured product (the epoxy resin compositions of following Reference Example 2 and Working Examples 1 to 7 were heat-cured at 150° C. for 16 hours).

The impact strength, mechanical properties (strength and elongation) and electrical properties (dielectric loss, tan δ %) are shown in the following Table 1.

(2) The change of viscosity with time of this epoxy resin composition was measured with a BL type rotational viscometer (manufactured by Tokyo Keiki K.K.), and the results are shown in the following Table 2.

(3) The coil of a rotating machine insulated with six layers of mica tape (or mica wrapper) was impregnated with the resin composition at a reduced pressure of about 5 mm Hg in a sealed container equipped with a vacuum-pressure impregnating tank.

The coil thus completely impregnated with the resin composition was heat-cured in an oven at 150° C.

The above cured oil was equipped with electrodes, and the dielectric loss-voltage properties were measured. The results are shown in the following Table 3.

(4) 5 g of the resin composition was placed in an oil bath, and the gelation time at 150° C. was measured with an automatic gelation time measuring apparatus.

REFERENCE EXAMPLE 2

An epoxy resin composition prepared by intimately mixing 80 parts by weight of Epikote 828 (trade name, manufactured by Shell Chemical Corp.), 80 parts by weight of methyl hexahydrophthalic anhydride (curing agent), 0.5 part by weight of 2,4,6-tris(dimethyl aminomethyl)phenol (accelerator) and 20 parts by weight of ethylene glycol diglycidyl ether.

WORKING EXAMPLE 1

An epoxy resin composition was prepared by adding 0.3 part by weight of zinc octanoate to 40 parts by weight of cresyl glycidyl ether; reacting the mixture with stirring at 50° C. for 3-4 hours in an atmosphere of nitrogen; cooling the reaction product to room temperature; admixing 60 parts by weight of Epikote 828 (trade name, manufactured by Shell Chemical Corp.) and 85 parts by weight of methyl tetrahydrophthalic anhydride with the cooled reaction product; and dissolving the resultant mixture with stirring.

WORKING EXAMPLE 2

An epoxy resin composition was prepared by adding 0.3 part by weight of zinc octanoate to 40 parts by weight of cresyl glycidyl ether; reacting the mixture with stirring at 50° C. for 3-4 hours in an atmosphere of nitrogen; cooling the reaction product to room temperature; admixing 30 parts by weight of Epikote 828 (trade name, manufactured by Shell Chemical Corp.), 30 parts by weight of Chissonox 221 (trade name, manufactured by Chisso K.K.) and 90 parts by weight of methyl tetrahydrophthalic anhydride with the cooled reaction product; and dissolving the resultant mixture with stirring.

WORKING EXAMPLE 3

An epoxy resin composition was prepared by adding 0.3 part by weight of zinc octanoate to 20 parts by weight of para-butyl phenyl glycidyl ether and 20 parts by weight of cresyl glycidyl ether; reacting the mixture with stirring at 50° C. for 3-4 hours in an atmosphere of nitrogen; cooling the resultant reaction product to room temperature; admixing 60 parts by weight of Epikote 828 (trade name, manufactured by Shell Chemical Corp.) and 85 parts by weight of methyl tetrahydrophthalic anhydride with the cooled reaction product; and dissolving the resultant mixture with stirring.

WORKING EXAMPLE 4

An epoxy resin composition was prepared by adding 0.3 part by weight of manganese octanoate to 40 parts by weight of cresyl glycidyl ether; reacting the mixture with stirring at 50° C. for 3 hours in an atmosphere of nitrogen; cooling the resultant reaction product to room temperature; admixing 60 parts by weight of Epikote 828 (trade name, manufactured by Shell Chemical Corp.) and 85 parts by weight of methyl tetrahydrophthalic anhydride with the cooled reaction product; and dissolving the resultant mixture with stirring.

WORKING EXAMPLE 5

An epoxy resin composition was prepared by adding 0.3 part by weight of manganese stearate to 40 parts by weight of para-butyl phenol glycidyl ether; reacting the mixture at 50° C. for 3.0 hours in an atmosphere of nitrogen; cooling the reaction product to room temperature; admixing 30 parts by weight of Epikote 828 and 95 parts by weight of methyl nadic anhydride (curing agent) with the cooled reaction product; and dissolving the resultant mixture with stirring.

WORKING EXAMPLE 6

An epoxy resin composition was prepared by adding 0.3 part by weight of cobalt octanoate to 20 parts by weight of cresyl glycidyl ether and 20 parts by weight of phenyl glycidyl ether; reacting the mixture at 50° C. for 3.0 hours in an atmosphere of nitrogen; cooling the reaction product to room temperature; admixing 30 parts by weight of Chissonox 221, 30 parts by weight of Epikote 828 and 90 parts by weight of methyl tetrahydrophthalic anhydride (curing agent) with the cooled reaction product; and dissolving the resultant mixture with stirring.

WORKING EXAMPLE 7

An epoxy resin composition was prepared by adding 0.3 part by weight of nickel stearate to 20 parts by weight of para-butyl phenol glycidyl ether and 20 parts by weight of butyl glycidyl ether; reacting the mixture at 50° C. for 3.0 hours in an atmosphere of nitrogen, cooling the reaction product to room temperature; admixing 20 parts by weight of Chissonox 221, 40 parts by weight of Epikote 828 and 90 parts by weight of methyl hexahydrophthalic anhydride (curing agent) with the cooled reaction product; and dissolving the resultant mixture with stirring.

The above prepared epoxy resin compositions of Reference Example 2 and Working Examples 1 to 7 were subjected to various tests as described in Reference Example 1, and the results are shown in the following Tables 1 to 4.

Table 1

Properties of Cured Epoxy Resin Compositions

| Epoxy Resin Composition | Impact Strength (Kg-cm/cm$^2$) (JIS-K-6705) | Tensile Test Strength (Kg/mm$^2$) | ASTM D638-52T Elongation (%) | Electrical Properties tan δ A 25° C. | tan δ A 150° C. |
|---|---|---|---|---|---|
| Reference Examples 1 | 2.5 | 4.6 | 1.9 | 0.47 | 12.5 |
| 2 | 3.5 | 6.0 | 2.5 | 0.35 | 13.4 |
| Working Examples 1 | 4.0 | 6.5 | 2.5 | 0.30 | 5.5 |
| 2 | 3.5 | 6.8 | 2.2 | 0.29 | 5.0 |
| 3 | 3.5 | 6.8 | 2.5 | 0.30 | 5.0 |
| 4 | 4.0 | 6.5 | 2.5 | 0.25 | 5.3 |
| 5 | 3.5 | 6.5 | 2.5 | 0.25 | 5.0 |
| 6 | 3.5 | 6.0 | 2.5 | 0.25 | 6.0 |
| 7 | 3.5 | 6.0 | 3.0 | 0.25 | 6.5 |

Table 2

Change of Viscosity with Time of Epoxy Resin Composition at 50° C.

| Epoxy Resin Composition | at the time of blending | 1 day | 3 days | 5 days | 7 days | 9 days |
|---|---|---|---|---|---|---|
| Reference Examples 1 | 38 | 42 | 54 | 70 | 110 | 210 |
| 2 | 110 | 370 | gelled | | | |
| Working Examples 1 | 20 | 24 | 38 | 67 | 72 | 83 |
| 2 | 18 | 22 | 40 | 72 | 78 | 90 |
| 3 | 19 | 24 | 42 | 74 | 79 | 92 |
| 4 | 20 | 24 | 38 | 67 | 71 | 80 |
| 5 | 20 | 23 | 41 | 74 | 81 | 95 |
| 6 | 20 | 24 | 40 | 70 | 76 | 92 |
| 7 | 22 | 26 | 40 | 74 | 78 | 89 |

Table 3

Electrical Properties of Coil Insulator

| Epoxy Resin Composition | Δ tan δ (%) |
|---|---|
| Reference Examples 1 | 6.20 |
| 2 | 6.50 |
| Working Examples 1 | 0.65 |
| 2 | 0.72 |
| 3 | 0.68 |
| 4 | 0.65 |
| 5 | 0.97 |
| 6 | 0.83 |
| 7 | 1.02 |

Δ tan δ represents a balance between tan δ values at 5 KV/mm and at 0.5 KV/mm.

Table 4

Gelation Time

| Epoxy Resin Composition | Gelation Time at 150° C. |
|---|---|
| Reference Examples 1 | 12 hr |
| 2 | 26 min |
| Working Examples 1 | 22 min |
| 2 | 16 min |
| 3 | 20 min |
| 4 | 20 min |
| 5 | 19 min |
| 6 | 19 min |
| 7 | 18 min |

As clearly seen from the above data, the epoxy resin composition of the present invention has a long pot life, appropriate viscosity and excellent workability in comparison with the conventional epoxy resin compositions. This is a great merit in economical considerations. Furthermore, when the epoxy resin composition of this invention is cured, it becomes an excellent insulator having good electrical and mechanical properties.

What we claim is:

1. An epoxy resin composition which comprises a mixture of 40-90 parts by weight of an epoxy resin having at least two epoxy groups per molecule; 70-100 parts by weight of an acid anhydride curing agent; and 60-10 parts by weight of the reaction product of the glycidyl ether of a monoalcohol and a metal carboxylate selected from the group consisting of the zinc, manganese, cobalt and nickel salts of octanoic acid, stearic acid, palmitic acid, naphthenic acid, caproic acid, enanthic acid, capric acid, myristic acid and lauric acid.

2. The epoxy resin composition according to claim 1, wherein said epoxy resin is an epoxy resin of the formula

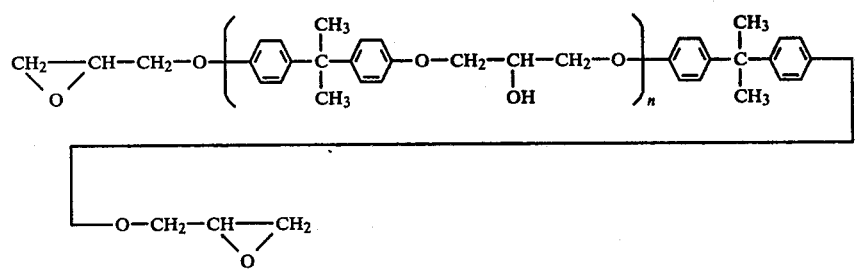

where n represents an integer of up to about 15.

3. The epoxy resin composition according to claim 1, wherein said epoxy resin is a mixture of the epoxy resin of the formula (I)

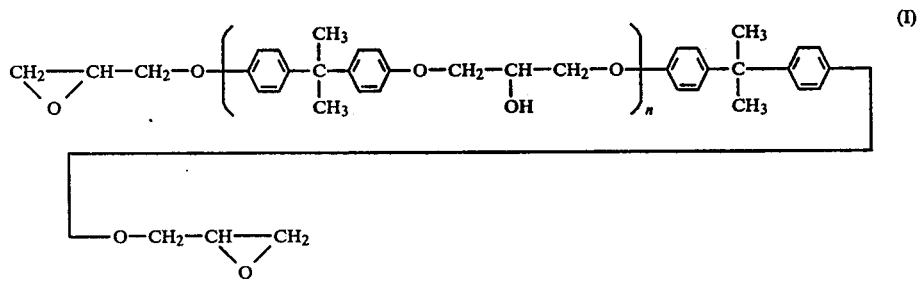

wherein n represents an integer of up to about 15, with an epoxy resin of the formula (II)

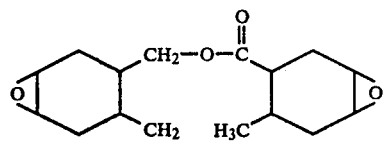

4. The epoxy resin composition according to claim 3, wherein the epoxy resin of the formula (II) is used in an amount of 20-60% by weight of the epoxy resin of the formula (I).

5. The epoxy resin composition according to claim 1, 2, 3 or 4, wherein said acid anhydride curing agent is liquid at room temperature.

6. The epoxy resin composition according to claim 1, 2, 3 or 4, wherein, in preparing said reaction product, said metal carboxylate is used in an amount of 0.2-1.0% by weight of said glycidyl ether of a monoalcohol.

7. The epoxy resin composition according to claim 5, wherein, in preparing said reaction product, said metal carboxylate is used in an amount of 0.2-1.0% by weight of said glycidyl ether of a monoalcohol.

8. The epoxy resin composition according to claim 1, 2, 3 or 4, wherein said metal carboxylate is selected from the group consisting of zinc octanoate, manganese octanoate, manganese stearate, cobalt octanoate and nickel stearate.

9. The epoxy resin composition according to claim 5, wherein said metal carboxylate is selected from the group consisting of zinc octanoate, manganese octanoate, manganese stearate, cobalt octanoate and nickel stearate.

10. The epoxy resin composition according to claim 6, wherein said metal carboxylate is selected from the group consisting of zinc octanoate, manganese octanoate, manganese stearate, cobalt octanoate and nickel stearate.

* * * * *